(12) United States Patent
Li et al.

(10) Patent No.: US 11,151,177 B2
(45) Date of Patent: Oct. 19, 2021

(54) SEARCH METHOD AND APPARATUS BASED ON ARTIFICIAL INTELLIGENCE

(71) Applicant: BEIJING BAIDU NETCOM SCIENCE AND TECHNOLOGY CO., LTD., Beijing (CN)

(72) Inventors: Yukun Li, Beijing (CN); Yi Liu, Beijing (CN); Yu Sun, Beijing (CN); Dianhai Yu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 301 days.

(21) Appl. No.: 16/054,842

(22) Filed: Aug. 3, 2018

(65) Prior Publication Data

US 2019/0065506 A1 Feb. 28, 2019

(30) Foreign Application Priority Data

Aug. 28, 2017 (CN) .......................... 201710748919.2

(51) Int. Cl.
| | | |
|---|---|---|
| *G06F 16/30* | (2019.01) | |
| *G06F 40/30* | (2020.01) | |
| *G06N 3/04* | (2006.01) | |
| *G06N 3/08* | (2006.01) | |
| *G06F 16/33* | (2019.01) | |
| *G06F 16/951* | (2019.01) | |
| *G06F 16/90* | (2019.01) | |

(52) U.S. Cl.
CPC ........ *G06F 16/3347* (2019.01); *G06F 16/951* (2019.01); *G06F 40/30* (2020.01); *G06N 3/0427* (2013.01); *G06N 3/0454* (2013.01); *G06N 3/08* (2013.01); *G06N 3/0481* (2013.01)

(58) Field of Classification Search
None
See application file for complete search history.

(56) References Cited

U.S. PATENT DOCUMENTS

| | | | |
|---|---|---|---|
| 7,644,047 B2 | 1/2010 | Assadian et al. | |
| 2009/0132566 A1* | 5/2009 | Ochi | ........................ G06F 40/14 |
| 2017/0124447 A1* | 5/2017 | Chang | ................. G06F 16/3334 |

FOREIGN PATENT DOCUMENTS

| | | |
|---|---|---|
| CN | 106407280 A | 2/2017 |
| CN | 106407311 A | 2/2017 |
| CN | 106815252 A | 6/2017 |

* cited by examiner

*Primary Examiner* — Kristopher Andersen
(74) *Attorney, Agent, or Firm* — Knobbe, Martens, Olson & Bear, LLP

(57) ABSTRACT

Embodiments of the present disclosure disclose a search method and apparatus based on artificial intelligence. A specific implementation of the method comprises: acquiring at least one candidate document related to a query sentence; determining a query word vector sequence corresponding to a segmented word sequence of the query sentence, and determining a candidate document word vector sequence corresponding to a segmented word sequence of each candidate document in the at least one candidate document; performing a similarity calculation for each candidate document in the at least one candidate document; selecting, in a descending order of similarities between the candidate document and the query sentence, a preset number of candidate documents from the at least one candidate document as a search result.

19 Claims, 5 Drawing Sheets

SEARCH METHOD AND APPARATUS BASED ON ARTIFICIAL INTELLIGENCE

CROSS-REFERENCE TO RELATED APPLICATIONS

This application claims priority to Chinese Patent Application No. 201710748919.2, filed on Aug. 28, 2017, titled "Search Method and Apparatus based on Artificial Intelligence," which is hereby incorporated by reference in its entirety.

TECHNICAL FIELD

The present disclosure relates to the technical field of computers, specifically to the technical field of Internet, and more particularly to a search method and apparatus based on artificial intelligence.

BACKGROUND

Artificial intelligence (AI) is a new technical science that studies and develops theories, methods, techniques and application systems used to simulate, extend and expand human intelligence. Artificial intelligence is a branch of computer science that attempts to understand the essence of intelligence, and produce a new intelligent machinery capable of responding in a way similar to human intelligence. Studies in this field includes robots, language recognition, image recognition, natural language processing, expert systems etc.

Natural language processing in the field of artificial intelligence is an important direction in the field of computer science and the field of artificial intelligence. The natural language processing studies various theories and methods that can realize effective communications between people and computers with a natural language. As an example, at present, a search engine may carry out retrieval according to a query sentence input by a user to obtain a plurality of documents (e.g., web pages) related to the query sentence, then sort the obtained plurality of documents according to a series of scoring strategies and sorting algorithms, select a document from the plurality of documents according to a sorting result and send the document to a terminal device used by the user.

However, most of the existing search engines use the text similarity between a query sentence and a document as a sorting criterion for sorting a plurality of documents related to the query sentence. Because the matching calculation between texts is slow and an ordinal relation between segmented words of the texts can not be determined, the sorting efficiency is low and the sorting is not accurate enough.

SUMMARY

The object of embodiments of the present disclosure is to provide an improved search method and apparatus based on artificial intelligence, to solve the technical problems mentioned in the above background section.

In a first aspect, the embodiments of the present disclosure provide a search method based on artificial intelligence, and the method includes: acquiring at least one candidate document related to a query sentence; determining a query word vector sequence corresponding to a segmented word sequence of the query sentence, and determining a candidate document word vector sequence corresponding to a segmented word sequence of each candidate document in the at least one candidate document; performing a similarity calculation for each candidate document in the at least one candidate document, the similarity calculation comprising: importing the candidate document word vector sequence of the candidate document into a pre-trained first neural network model to generate a first candidate document semantic vector for characterizing a semantic of the candidate document, importing the query word vector sequence into the first neural network model to generate a first query sentence semantic vector for characterizing a semantic of the query sentence, and determining the similarity between the candidate document and the query sentence according to the similarity between the first candidate document semantic vector of the candidate document and the first query sentence semantic vector; and selecting, in a descending order of the similarity between the candidate document and the query sentence, a preset number of candidate document from the at least one candidate document as a search result.

In some embodiments, after importing the candidate document word vector sequence of the candidate document into the pre-trained first neural network model to generate the first candidate document semantic vector for characterizing the semantic of the candidate document, the similarity calculation further includes: importing the candidate document word vector sequence of the candidate document into a pre-trained second neural network model to generate a second candidate document semantic vector for characterizing the semantic of the candidate document; and performing a first update for each query word vector in the query word vector sequence, the first update including: splicing the second candidate document semantic vector of the candidate document with the query word vector to generate an adjusted vector of the query word vector, and updating the query word vector by using the generated adjusted vector of the query word vector.

In some embodiments, the splicing the second candidate document semantic vector of the candidate document with the query word vector to generate an adjusted vector of the query word vector includes: performing a linear transformation on the second candidate document semantic vector of the candidate document and the query word vector to generate the adjusted vector of the query word vector.

In some embodiments, the splicing the second candidate document semantic vector of the candidate document with the query word vector to generate an adjusted vector of the query word vector includes: performing a linear transformation on the second candidate document semantic vector of the candidate document and the query word vector to generate a first vector; and performing a nonlinear transformation on the first vector to generate the adjusted vector of the query word vector.

In some embodiments, before performing the similarity calculation for each candidate document in the at least one candidate document, the method further includes: importing the query word vector sequence into a pre-trained third neural network model to generate a second query sentence semantic vector for characterizing the semantic of the query sentence; and before importing the candidate document word vector sequence of the candidate document into the pre-trained first neural network model to generate the first candidate document semantic vector for characterizing the semantic of the candidate document, the similarity calculation steps further includes: performing a second update for each candidate document word vector in the candidate document word vector sequence of the candidate document, the second update including: splicing the second query sentence semantic vector with the candidate document word vector to generate an adjusted vector of the candidate document word vector, and updating the candidate document word vector by using the generated adjusted vector of the candidate document word vector.

In some embodiments, the splicing the second query sentence semantic vector with the candidate document word vector to generate an adjusted vector of the candidate document word vector includes: performing a linear transformation on the second query sentence semantic vector and the candidate document word vector to generate the adjusted vector of the candidate document word vector.

In some embodiments, the splicing the second query sentence semantic vector with the candidate document word vector to generate an adjusted vector of the candidate document word vector includes: performing a linear transformation on the second query sentence semantic vector and the candidate document word vector to generate the second vector; and performing a nonlinear transformation on the second vector to generate the adjusted vector of the candidate document word vector.

In some embodiments, the determining a query word vector sequence corresponding to the segmented word sequence of the query sentence includes: acquiring a first word vector table for characterizing a corresponding relation between a query sentence segmented word and the query word vector; and determining the query word vector sequence corresponding to the segmented word sequence of the query sentence according to the first word vector table.

In some embodiments, the determining a candidate document word vector sequence corresponding to a segmented word sequence of each candidate document in the at least one candidate document includes: acquiring a second word vector table for characterizing a corresponding relation between a document segmented word and a document word vector; and for each candidate document in the at least one candidate document, determining the candidate document word vector sequence corresponding to the segmented word sequence of the candidate document according to the second word vector table.

In a second aspect, the embodiments of the present disclosure provide a search apparatus based on artificial intelligence, and the apparatus includes: an acquiring unit, for acquiring at least one candidate document related to a query sentence; a determining unit, for determining a query word vector sequence corresponding to a segmented word sequence of the query sentence, and determining a candidate document word vector sequence corresponding to a segmented word sequence of each candidate document in the at least one candidate document; a similarity calculating unit, for performing a similarity calculation for each candidate document in the at least one candidate document, the similarity calculation comprising: importing the candidate document word vector sequence of the candidate document into a pre-trained first neural network model to generate a first candidate document semantic vector for characterizing a semantic of the candidate document, importing the query word vector sequence into the first neural network model to generate a first query sentence semantic vector for characterizing the semantic of the query sentence, and determining the similarity between the candidate document and the query sentence according to the similarity between the first candidate document semantic vector of the candidate document and the first query sentence semantic vector; and a selecting unit, for selecting, in a descending order of the similarity between the candidate document and the query sentence, a preset number of candidate documents from the at least one candidate document as a search result.

In some embodiments, the similarity calculating unit is further used for: importing the candidate document word vector sequence of the candidate document into a pre-trained second neural network model to generate a second candidate document semantic vector for characterizing the semantic of the candidate document; and performing a first update for each query word vector in the query word vector sequence, the first update including: splicing the second candidate document semantic vector of the candidate document with the query word vector to generate an adjusted vector of the query word vector, and updating the query word vector by using the generated adjusted vector of the query word vector.

In some embodiments, the similarity calculating unit is further used for: performing a linear transformation on the second candidate document semantic vector of the candidate document and the query word vector to generate the adjusted vector of the query word vector.

In some embodiments, the similarity calculating unit is further used for: performing a linear transformation on the second candidate document semantic vector of the candidate document and the query word vector to generate a first vector; and performing a nonlinear transformation on the first vector to generate the adjusted vector of the query word vector.

In some embodiments, the apparatus further includes: a generating unit, for importing the query word vector sequence into a pre-trained third neural network model to generate a second query sentence semantic vector for characterizing the semantic of the query sentence; and the similarity calculating unit is further used for: performing a second update for each candidate document word vector in the candidate document word vector sequence of the candidate document, the second update including: splicing the second query sentence semantic vector with the candidate document word vector to generate an adjusted vector of the candidate document word vector, and updating the candidate document word vector by using the generated adjusted vector of the candidate document word vector.

In some embodiments, the similarity calculating unit is further used for: performing a linear transformation on the second query sentence semantic vector and the candidate document word vector to generate the adjusted vector of the candidate document word vector.

In some embodiments, the similarity calculating unit is further used for: performing a linear transformation on the second query sentence semantic vector and the candidate document word vector to generate a second vector, and performing a nonlinear transformation on the second vector to generate the adjusted vector of the candidate document word vector.

In some embodiments, the determining unit is further used for: acquiring a first word vector table for characterizing a corresponding relation between a query sentence segmented word and the query word vector; and determining a query word vector sequence corresponding to the segmented word sequence of the query sentence according to the first word vector table.

In some embodiments, the determining unit is further used for: acquiring a second word vector table for characterizing a corresponding relation between a document segmented word and a document word vector; and for each candidate document in the at least one candidate document, determining the candidate document word vector sequence corresponding to the segmented word sequence of the candidate document according to the second word vector table.

In a third aspect, the embodiments of the present disclosure provide a server including one or more processors, and a storage device for storing one or more programs, and when the one or more programs are executed by the one or more processors, the one or more processors implement the method described in any implementation in the first aspect.

In a fourth aspect, the embodiments of the present disclosure provide a computer readable storage medium on which computer programs are stored, and when the computer programs are executed by the processors, the method as described in any implementation in the first aspect is implemented.

According to the search method and apparatus based on artificial intelligence, provided by the embodiments of the present disclosure, at least one candidate document related to the query sentence is acquired first. Then, a query word vector sequence corresponding to a segmented word sequence of the query sentence is determined, and a candidate document word vector sequence corresponding to a segmented word sequence of each candidate document in the at least one candidate document is determined. Then, the similarity calculation is performed for each candidate document in the at least one candidate document, the similarity calculation including: introducing the candidate document word vector sequence of the candidate document into a pre-trained first neural network model to generate a first candidate document semantic vector for characterizing the semantic of the candidate document, importing the query word vector sequence into the first neural network model to generate a first query sentence semantic vector for characterizing the semantic of the query sentence, and determining the similarity between the candidate document and the query sentence according to the similarity between the first candidate document semantic vector of the candidate document and the first query sentence semantic vector. Finally, a preset number of candidate documents are selected from the at least one candidate document as a search result in a descending order of similarities between the candidate document and the query sentence. Therefore, candidate documents and query sentences are expressed as semantic vectors through a neural network model, and then the candidate documents are sorted according to the similarity between semantic vectors of the candidate documents and semantic vectors of the query sentences, thus improving the correlation degree between recalled search results and query sentences input by a user and meeting search requirements of the user.

BRIEF DESCRIPTION OF THE DRAWINGS

Other features, objectives and advantages of the present disclosure will become more apparent upon reading the detailed description to non-limiting embodiments with reference to the accompanying drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
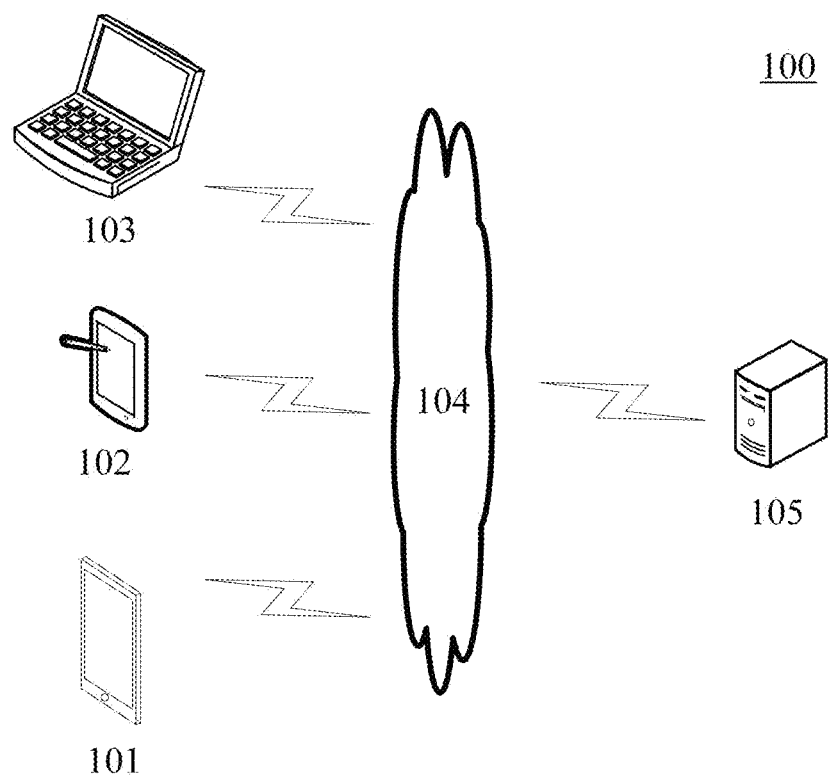
FIG. 1 is an architectural diagram of an exemplary system in which the present disclosure may be implemented.

FIG. 1 shows an exemplary architecture of a system 100 in which a search method based on artificial intelligence or a search apparatus based on artificial intelligence according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as webpage browser applications, shopping applications, search applications, instant messaging tools, mailbox clients, and social platform software may be installed on the terminal devices 101, 102 and 103.

The terminal devices 101, 102 and 103 may be various electronic devices having a display screen and supporting webpage browsing, including but not limited to, smart phones, tablet computers, laptop computers and desktop computers.

The server 105 may be a server providing various services, for example, a backend search server supporting searching websites displayed on the terminal devices 101, 102 or 103. The backend search server may perform a corresponding processing on data such as received query sentences, and return a processing result (for example, a search result) to the terminal device.

It should be noted that the search method based on artificial intelligence according to the embodiments of the present disclosure is generally executed by the server 105. Accordingly, the search apparatus based on artificial intelligence is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
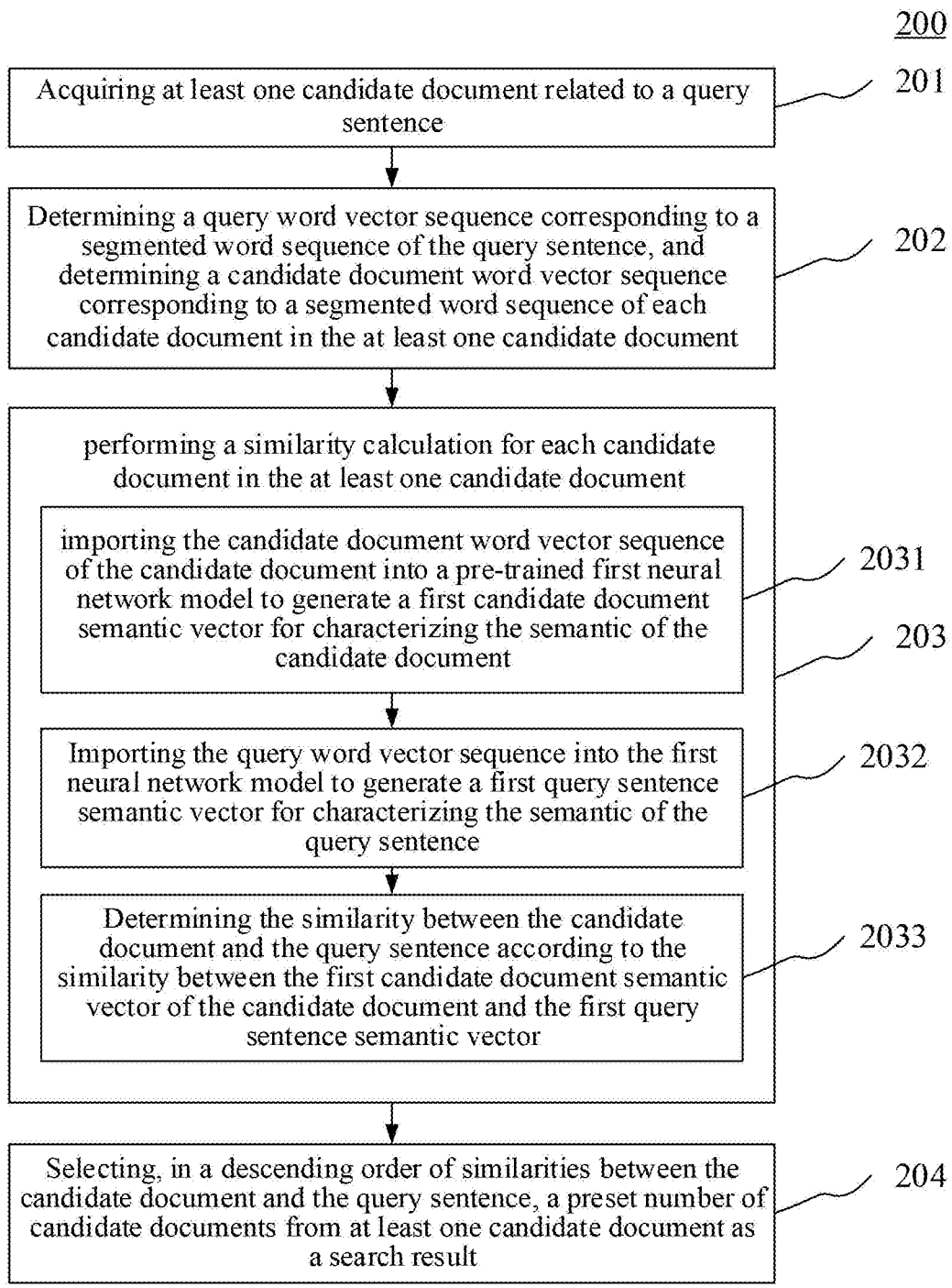
FIG. 2 is a flowchart of a search method based on artificial intelligence according to an embodiment of the present disclosure.

Reference is made to FIG. 2, which shows a flow 200 of an embodiment of the search method based on artificial intelligence according to the present disclosure. The search method based on artificial intelligence includes steps 201 to 204.

Step 201 includes acquiring at least one candidate document related to a query sentence.

In the present embodiment, the electronic device (e.g., a server shown in FIG. 1) on which the search method based on artificial intelligence is implemented can first acquire the query sentence in a search request and then acquire at least one candidate document related to the query sentence when receiving the search request sent by a user using a terminal and including the query sentence. As an example, the candidate document may be a web page.

Here, the query sentence (i.e., query) may include at least one of: characters, spelling, symbols, or numbers in various languages.

As an example, the electronic device can search for the candidate document related to the query sentence in a database of a cloud server in network connection with the electronic device, or the electronic device can alternatively crawl on a pre-designated website to acquire the candidate document related to the query sentence, which is not limited in the present disclosure.

The database of the cloud server may be established in advance, and specifically, the database can be established in a statistical way. For example, a backend staff performs a statistics on search behaviors of the user on a search engine and stores a document searched frequently in the database.

Alternatively, the database of the cloud server may be established by means of machine learning. For example, documents frequently searched by the user are obtained from web pages by using a crawler technology and the like and stored in the database.

Step 202 includes determining a query word vector sequence corresponding to a segmented word sequence of the query sentence, and determining a candidate document word vector sequence corresponding to a segmented word sequence of each candidate document in the at least one candidate document.

In the present embodiment, the electronic device (e.g., the server shown in FIG. 1) can first perform a word segmentation on the query sentence to obtain the segmented word sequence corresponding to the query sentence, and then determine the query word vector sequence corresponding to the segmented word sequence of the query sentence. Next, the electronic device can perform a word segmentation for each candidate document in the at least one candidate document to obtain the segmented word sequence corresponding to each candidate document in the at least one candidate document, and finally determine the candidate document word vector sequence corresponding to the segmented word sequence of each candidate document in the at least one candidate document. A segmented word refers to a word or a phrase without a special symbol or a punctuation mark. The segmented word sequence is a sequence consisting of at least one segmented word arranged in sequence.

In the present embodiment, the electronic device may use various word segmentation methods to perform the word segmentation on the query sentence and the candidate document, for example, using a full segmentation method to first segment all possible words that match a language thesaurus, and then determine an optimal segmentation result using a statistical language model.

It should be noted that when the electronic device performs the word segmentation on the candidate document, the word segmentation may be performed not only on the candidate document, but also on related information of the candidate document, and a word segmentation result of performing word segmentation on the related information of the candidate document is taken as a segmented word sequence corresponding to the candidate document. For example, the related information of the candidate document may be summary information of the candidate document or title information of the candidate document. For another example, if the candidate document is a web page, the related information of the candidate document may be title information of the web page, content information of the web page, or an anchor text linked to the web page. The title information of the web page may include a tag title, a real title of the web page, and a main title.

In the present embodiment, the electronic device may use various methods to determine the word vector corresponding to the segmented word. As an example, the method can be: a bag-of-words model method, an LSA (Latent Semantic Analysis) method, a PLSA (Probabilistic Semantic Analysis) method, an LSI (Latent Semantic Indexing) method, a PLSI (Probabilistic Latent Semantic Indexing) method, etc. In practice, Word2Vec/Doc2Vec and other tools can also be used to convert segmented words into word vectors.

In some optional implementations of the present embodiment, the electronic device may determine the query word vector sequence corresponding to the segmented word sequence of the query sentence according to the following steps.

First, acquiring a first word vector table for characterizing a corresponding relation between a query sentence segmented word and a query word vector.

In this implementation, the first word vector table may be a word vector table trained according to a segmented word sequence of a history query sentence of a user in a search log. The first word vector table is used to map words or phrases into real number vectors, and the mapped real number vectors are word vectors. By using the word vector table, features in a natural language can be reduced from a high dimensional space of a vocabulary size to a relatively low dimensional space.

It should be noted that how to train the word vector table is an existing technology that is widely studied and applied at present and will not be described here.

It should be appreciated that the first word vector table can be trained and updated in real time with the update of the search log, so that the acquired first word vector table can be a first word vector table updated in real time.

Second, the query word vector sequence corresponding to the segmented word sequence of the query sentence is determined according to the first word vector table.

In some optional implementations of the present embodiment, the electronic device can determine the candidate document word vector sequence corresponding to the segmented word sequence of each candidate document in the at least one candidate document according to the following steps.

First, a second word vector table for characterizing a corresponding relation between a document segmented word and a document word vector is acquired.

In this implementation, the second word vector table may be a word vector table trained according to the segmented word sequence of the candidate document in the candidate document.

It should be appreciated that the second word vector table may be trained and updated in real time with the update of the candidate document, so that the acquired second word vector table may be a second word vector table updated in real time.

Second, for each candidate document in the at least one candidate document, the candidate document word vector sequence corresponding to the segmented word sequence of the candidate document is determined according to the second word vector table.

Step 203 includes performing a similarity calculation for each candidate document in the at least one candidate document.

In the present embodiment, the electronic device on which the search method based on artificial intelligence is implemented may perform the similarity calculation for each candidate document in the at least one candidate document. The similarity calculation may include the sub-steps 2031 to 2033.

Sub-step 2031 includes importing the candidate document word vector sequence of the candidate document into a pre-trained first neural network model to generate a first candidate document semantic vector for characterizing the semantic of the candidate document.

Here, the first neural network model may be various artificial neural network models, and is not specifically limited in the present disclosure. As an example, the first neural network model may include at least one of: a convolutional neural network model, a cyclic neural network model, or a forward neural network model. The first neural network model is a pre-trained neural network model for characterizing a corresponding relation between the word vector sequence and the word vector.

It should be noted that a segmented word vector sequence of a large number of documents and a segmented word vector sequence of a query sentence can be used as training data to train an initial neural network model so as to obtain the trained first neural network model.

Sub-step 2032 includes importing the query word vector sequence into the first neural network model to generate a first query sentence semantic vector for characterizing the semantic of the query sentence.

Sub-step 2033 includes determining the similarity between the candidate document and the query sentence according to the similarity between the first candidate document semantic vector of the candidate document and the first query sentence semantic vector.

Here, the electronic device may calculate the similarity between the first candidate document semantic vector of the candidate document and the first query sentence semantic vector, and determine the calculated similarity as the similarity between the candidate document and the query sentence. As an example, the similarity here may be cosine similarity, a Pearson correlation coefficient, a Jaccard coefficient, and the like.

Through step 203, for each candidate document in the at least one candidate document, the similarity between the candidate document and the query sentence is calculated.

Step 204 includes selecting, in a descending order of similarities between the candidate document and the query sentence, a preset number of candidate documents from at least one candidate document as a search result.

In the present embodiment, the electronic device may select, in the descending order of similarities between the candidate document and the query sentence, the preset number of candidate documents from the at least one candidate document as a search result according to the similarity between each candidate document and the query sentence calculated in step 203. Then, the search result may be sent to the terminal device that sends a search request including the query sentence.

In the method according to the above embodiment of the present disclosure, a candidate document and a query sentence are expressed as a semantic vector through a neural network model, and then the candidate document is sorted according to the similarity between the semantic vector of the candidate document and the semantic vector of the query sentence, thus improving the correlation degree between the recalled search result and the query sentence input by a user and meeting search requirements of the user.

Figure 3:
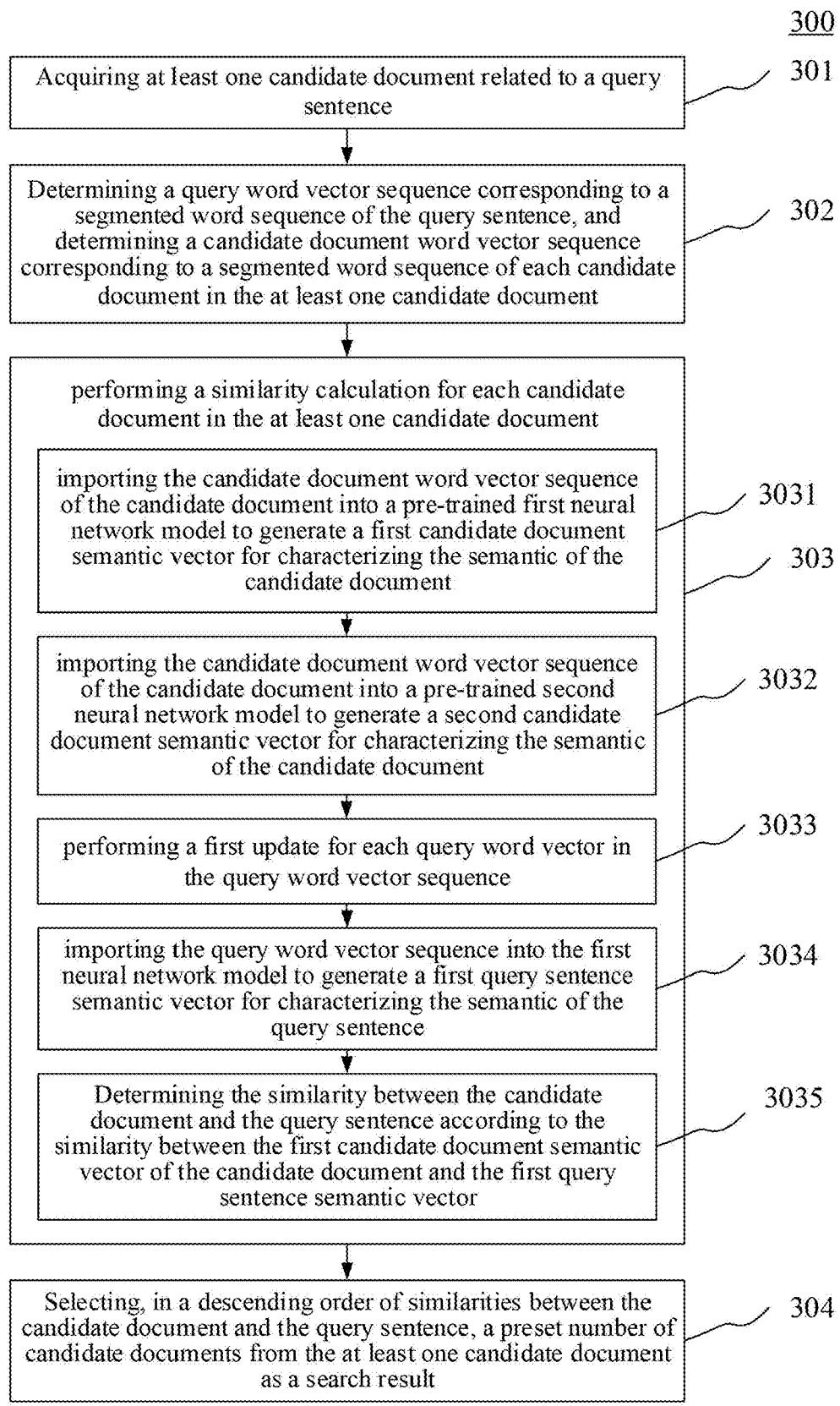
FIG. 3 is a flowchart of a search method based on artificial intelligence according to another embodiment of the present disclosure.

Reference is made to FIG. 3, which shows a flow 300 of the search method based on artificial intelligence according to another embodiment. The flow 300 of the search method based on artificial intelligence includes steps 301 to 305.

Step 301 includes acquiring at least one candidate document related to a query sentence.

Step 302, determining a query word vector sequence corresponding to a segmented word sequence of the query sentence, and determining a candidate document word vector sequence corresponding to a segmented word sequence of each candidate document in the at least one candidate document.

In the present embodiment, the specific operations of step 301 and step 302 are basically the same as those of step 201 and step 202 in the embodiment shown in FIG. 2, and will not be repeated here.

Step 303 includes performing a similarity calculation for each candidate document in the at least one candidate document.

In the present embodiment, the electronic device on which the search method based on artificial intelligence is implemented may perform the similarity calculation for each candidate document in the at least one candidate document. The similarity calculation may include sub-steps 3031 to 3034.

Sub-step 3031 includes importing the candidate document word vector sequence of the candidate document into a pre-trained first neural network model to generate a first candidate document semantic vector for characterizing the semantic of the candidate document.

In the present embodiment, the specific operations of step 3031 are basically the same as those of step 2031 in the embodiment shown in FIG. 2, and will not be repeated here.

Sub-step 3032 includes importing the candidate document word vector sequence of the candidate document into a pre-trained second neural network model to generate a second candidate document semantic vector for characterizing the semantic of the candidate document.

Here, the pre-trained second neural network model may be various artificial neural network models, and is not specifically limited in the present disclosure. As an example, the second neural network model may include at least one of a convolutional neural network model, a cyclic neural network model, or a forward neural network model. The second neural network model is a pre-trained neural network model for characterizing a corresponding relation between a word vector sequence and a word vector.

It should be noted that a segmented word vector sequence of a large number of documents can be used as training data to train an initial neural network model so as to obtain a trained second neural network model.

Optionally, the second neural network model here may be a neural network model having a simpler structure than the first neural network model.

Sub-step 3033 includes performing a first update for each query word vector in the query word vector sequence.

The first update may include two steps.

First step includes splicing the second candidate document semantic vector of the candidate document with the query word vector to generate an adjusted vector of the query word vector.

Here, the second candidate document semantic vector of the candidate document and the query word vector may be spliced in various ways, which is not specifically limited in the present disclosure.

In some implementations, a linear transformation can be performed on the second candidate document semantic vector of the candidate document and the query word vector to generate the adjusted vector of the query word vector.

In some implementations, alternatively the linear transformation may be first performed on the second candidate document semantic vector of the candidate document and the query word vector to generate a first vector, and a nonlinear transformation is then performed on the first vector to generate the adjusted vector of the query word vector. As an example, the nonlinear transformation of the first vector may take the first vector as an input parameter of a Sigmoid function or a hyperbolic tangent function (also called a Tan h function), and take a result obtained by executing the Sigmoid function or the hyperbolic tangent function (also called a Tan h function) as the adjusted vector of the query word vector.

Second step includes updating the query word vector with the generated adjusted vector of the query word vector.

Through sub-step 3033, each query word vector in the query word vector sequence is updated by using the second candidate document semantic vector of the candidate document, so that the query word vector sequence fuses the semantic of the candidate document. In the following sub-step 3034, when the query word vector sequence is imported into the first neural network model to generate a first query sentence semantic vector for characterizing the semantic of the query sentence, the imported query word vector sequence has fused the semantic of the candidate document, so that the semantic of the candidate document can be fused in the first query sentence semantic vector obtained in sub-step 3034, and then when the similarity between the first candidate document semantic vector of the candidate document and the first query sentence semantic vector is calculated in sub-step 3035, the similarity calculation is not performed between two independent vectors, and information of one vector is fused into the other vector, so that the accuracy of the similarity calculation between the two vectors can be improved.

Sub-step 3034 includes importing the query word vector sequence into the first neural network model to generate a first query sentence semantic vector for characterizing the semantic of the query sentence.

Sub-step 3035 includes determining the similarity between the candidate document and the query sentence according to the similarity between the first candidate document semantic vector of the candidate document and the first query sentence semantic vector.

In the present embodiment, the specific operations of sub-step 3034 and sub-step 3035 are basically the same as those of sub-step 2032 and sub-step 2033 in the embodiment shown in FIG. 2, and will not be repeated here.

Through step 303, for each candidate document in the at least one candidate document, the similarity between the candidate document and the query sentence is calculated.

Step 304 includes selecting, in a descending order of similarities between the candidate document and the query sentence, a preset number of candidate documents from the at least one candidate document as a search result.

In the present embodiment, the specific operations of step 304 are basically the same as those of step 204 in the embodiment shown in FIG. 2, and will not be repeated here.

As can be seen from FIG. 3, compared with the corresponding embodiment of FIG. 2, the flow 300 of the search method based on artificial intelligence in the present embodiment has more steps of importing the candidate document word vector sequence of the candidate document into a pre-trained second neural network model to generate a second candidate document semantic vector for characterizing the semantic of the candidate document, and updating each query word vector in the query word vector sequence by using the generated second candidate document semantic vector of the candidate document. Thus, the solution described in the present embodiment can introduce the semantic of the candidate document into the query word vector sequence, thereby improving the accuracy of the similarity calculation between the candidate document and the query sentence, and then increasing the correlation degree between a recalled search result and a query sentence input by a user.

Hereinafter, reference is made to FIG. 4, which shows a flow 400 a search method based on artificial intelligence according to another embodiment. The flow 400 of the search method based on artificial intelligence includes steps 401 to 405.

Step 401 includes acquiring at least one candidate document related to a query sentence.

Step 402 includes determining a query word vector sequence corresponding to a segmented word sequence of the query sentence, and determining a candidate document word vector sequence corresponding to a segmented word sequence of each candidate document in the at least one candidate document.

In the present embodiment, the specific operations of step 401 and step 402 are basically the same as those of step 201 and step 202 in the embodiment shown in FIG. 2, and will not be repeated here.

Step 403 includes importing the query word vector sequence into a pre-trained third neural network model to generate a second query sentence semantic vector for characterizing the semantic of the query sentence.

Here, the pre-trained third neural network model may be various artificial neural network models, and is not specifically limited in the present disclosure. As an example, the third neural network model may include at least one of: a convolutional neural network model, a cyclic neural network model, or a forward neural network model. The third neural network model is a pre-trained neural network model for characterizing a corresponding relation between a word vector sequence and a word vector.

It should be noted that a segmented word vector sequence of a large number of query sentences can be used as training data to train an initial neural network model so as to obtain the trained third neural network model.

Optionally, the third neural network model here may be a neural network model having a simpler structure relative to the first neural network model.

Step 404 includes performing a similarity calculation for each candidate document in the at least one candidate document.

In the present embodiment, the electronic device on which the search method based on artificial intelligence is implemented may perform the similarity calculation for each candidate document in the at least one candidate document. The similarity calculation may include sub-steps 4041 to 4044.

Sub-step 4041 includes performing a second update for each candidate document word vector in the candidate document word vector sequence of the candidate document.

The second update may include two steps.

The first step includes splicing the second query sentence semantic vector and the candidate document word vector to generate an adjusted vector of the candidate document word vector.

Here, the second query sentence semantic vector and the candidate document word vector can be spliced in various ways, which is not specifically limited in the present disclosure.

In some implementations, a linear transformation may be performed on the second query sentence semantic vector and the candidate document word vector to generate the adjusted vector of the candidate document word vector.

In some implementations, a linear transformation may be performed on the second query sentence semantic vector and the candidate document word vector to generate a second vector, and a nonlinear transformation is then performed on the second vector to generate the adjusted vector of the candidate document word vector. As an example, the nonlinear transformation of the second vector may take the second vector as an input parameter of a Sigmoid function or a hyperbolic tangent function (also called a Tan h function), and take a result obtained by executing the Sigmoid function or the hyperbolic tangent function (also called a Tan h function) as the adjusted vector of the candidate document word vector.

The second step includes updating the candidate document word vector by using the generated adjusted vector of the candidate document word vector.

Through sub-step 4041, each candidate document word vector in the candidate document word vector sequence is updated by using the second query sentence semantic vector of the query sentence, so that the candidate document word vector sequence fuses the semantic of the query sentence. In the following sub-step 4042, when the candidate document word vector sequence of the candidate document is imported into the pre-trained first neural network model to generate a first candidate document semantic vector for characterizing the semantic of the candidate document, the imported candidate document word vector sequence has fused the semantic of the query sentence, so that the semantic of the query sentence can be fused in the first candidate document semantic vector obtained in sub-step 4042, and then when the similarity between the first candidate document semantic vector of the candidate document and the first query sentence semantic vector is calculated in sub-step 4044, the similarity calculation is not performed between two independent vectors, and information of one vector is fused into the other vector, so that the accuracy of the similarity calculation between the two vectors is improved.

Sub-step 4042 includes importing the candidate document word vector sequence of the candidate document into a pre-trained first neural network model to generate a first candidate document semantic vector for characterizing the semantic of the candidate document.

Sub-step 4043 includes importing the query word vector sequence into the first neural network model to generate a first query sentence semantic vector for characterizing the semantic of the query sentence.

Sub-step 4044: determining the similarity between the candidate document and the query sentence according to the similarity between the first candidate document semantic vector of the candidate document and the first query sentence semantic vector.

In the present embodiment, the specific operations of sub-step 4042, sub-step 4043 and sub-step 4044 are basically the same as those of sub-step 2031, sub-step 2032 and sub-step 2033 in the embodiment shown in FIG. 2, and will not be repeated here.

Through step 404, for each candidate document in the at least one candidate document, the similarity between the candidate document and the query sentence is calculated.

Step 405 includes selecting, in a descending order of similarities between the candidate document and the query sentence a preset number of candidate documents from at least one candidate document as a search result.

In the present embodiment, the specific operations of step 405 are basically the same as those of step 204 in the embodiment shown in FIG. 2, and will not be repeated here.

Figure 4:
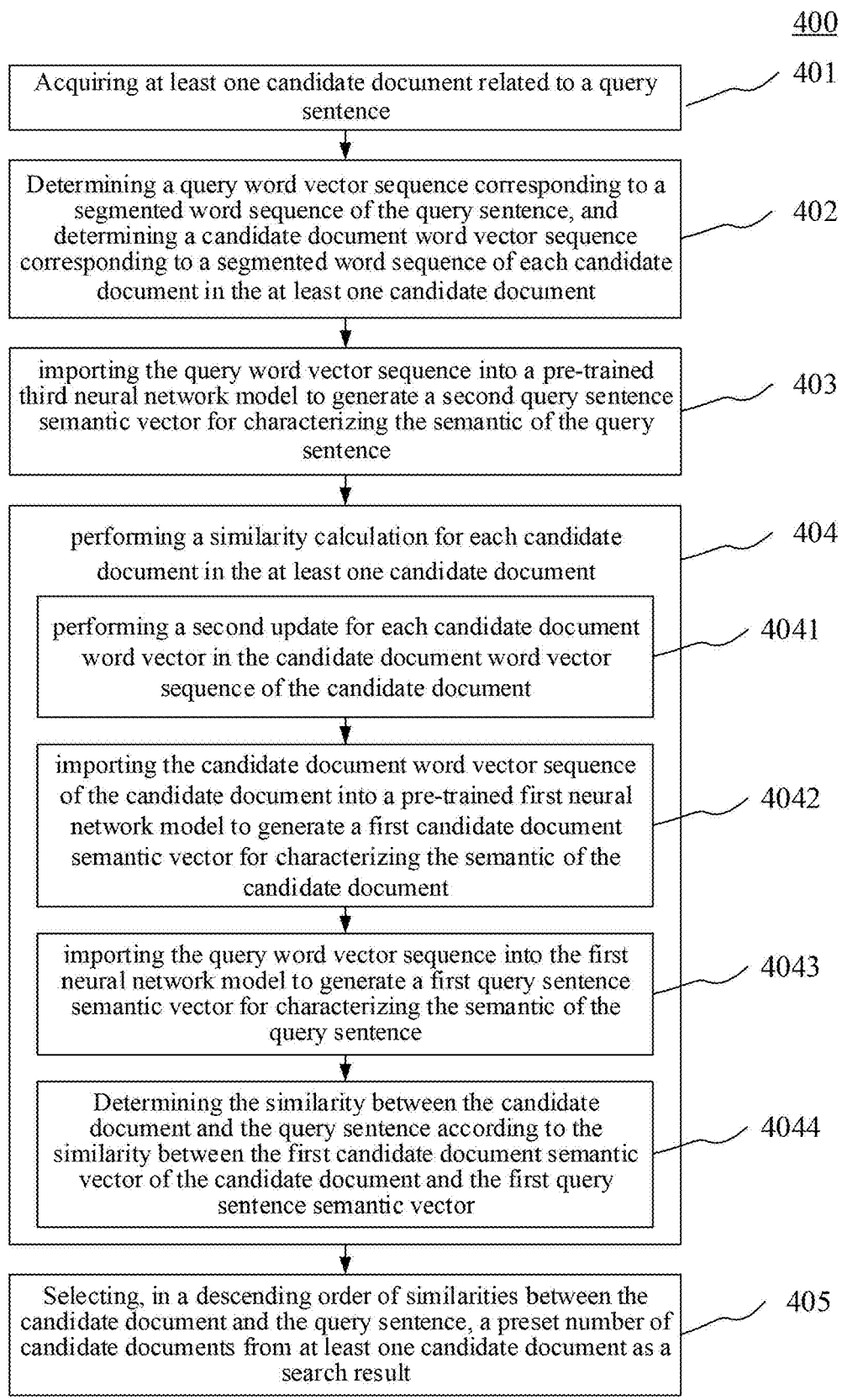
FIG. 4 is a flowchart of a search method based on artificial intelligence according to yet another embodiment of the present disclosure.

As can be seen from FIG. 4, compared with the corresponding embodiment of FIG. 2, the flow 400 of the search method based on artificial intelligence in the present embodiment has more steps of importing the query word vector sequence into a pre-trained third neural network model to generate a second query sentence semantic vector for characterizing the semantic of the query sentence, and updating each candidate document word vector in each candidate document word vector sequence by using the generated second query sentence semantic vector. Thus, the solution described in the present embodiment can introduce the semantic of the query sentence into the candidate document word vector sequence, thereby improving the accuracy of similarity calculation between the candidate document and the query sentence, and increasing the correlation degree between a recalled search result and a query sentence input by a user.

Figure 5:
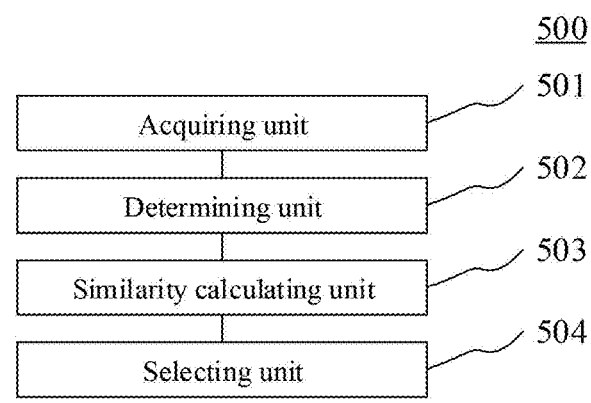
FIG. 5 is a structural schematic diagram of a search apparatus based on artificial intelligence according to an embodiment of the present disclosure.

Further referring to FIG. 5, as the implementation of the method shown in the above figures, the present disclosure provides a search apparatus based on artificial intelligence according to an embodiment, the embodiment of the apparatus corresponds to the embodiment of the method shown in FIG. 2, and the apparatus can be specifically applied to various types of electronic devices.

As shown in FIG. 5, the search apparatus 500 based on artificial intelligence in the present embodiment includes an acquiring unit 501, a determining unit 502, a similarity calculating unit 503, and a selecting unit 504. The acquiring unit 501 is configured for acquiring at least one candidate document related to a query sentence; the determining unit 502 is configured for determining a query word vector sequence corresponding to a segmented word sequence of the query sentence, and determining a candidate document word vector sequence corresponding to a segmented word sequence of each candidate document in the at least one candidate document; the similarity calculating unit 503 is configured for executing a similarity calculation for each candidate document in the at least one candidate document, the similarity calculation including: importing the candidate document word vector sequence of the candidate document into a pre-trained first neural network model to generate a first candidate document semantic vector for characterizing the semantic of the candidate document, importing the query word vector sequence into the first neural network model to generate a first query sentence semantic vector for characterizing the semantic of the query sentence, and determining the similarity between the candidate document and the query sentence according to the similarity between the first candidate document semantic vector of the candidate document and the first query sentence semantic vector; and the selecting unit 504 is configured for selecting, in a descending order of similarities between the candidate document and the query sentence, a preset number of candidate documents from the at least one candidate document as a search result.

In the present embodiment, the specific processing and technical effects thereof of the acquiring unit 501, the determining unit 502, the similarity calculating unit 503 and the selecting unit 504 of the search apparatus 500 based on artificial intelligence may refer to related descriptions of step 201, step 202, step 203 and step 204 in the embodiment corresponding to FIG. 2 respectively, and will not be repeated here.

In some optional implementations of the present embodiment, the similarity calculating unit 503 may be further configured for: importing the candidate document word vector sequence of the candidate document into a pre-trained second neural network model to generate a second candidate document semantic vector for characterizing the semantic of the candidate document; and performing a first update for each query word vector in the query word vector sequence, the first update including: splicing the second candidate document semantic vector of the candidate document with the query word vector to generate an adjusted vector of the query word vector, and updating the query word vector by using the generated adjusted vector of the query word vector.

In some optional implementations of the present embodiment, the similarity calculating unit 503 may be further configured for: performing a linear transformation on the second candidate document semantic vector of the candidate document and the query word vector to generate the adjusted vector of the query word vector.

In some optional implementations of the present embodiment, the similarity calculating unit 503 may be further configured for: performing a linear transformation on the second candidate document semantic vector of the candidate document and the query word vector to generate a first vector; and performing a nonlinear transformation on the first vector to generate the adjusted vector of the query word vector.

In some optional implementations of the present embodiment, the apparatus 500 may further include: a generating unit (not shown), for importing the query word vector sequence into a pre-trained third neural network model to generate a second query sentence semantic vector for characterizing the semantic of the query sentence; and the similarity calculating unit 503 may be further configured for: perform a second update for each candidate document word vector in the candidate document word vector sequence of the candidate document, the second update including: splicing the second query sentence semantic vector with the candidate document word vector to generate an adjusted vector of the candidate document word vector, and updating the candidate document word vector with the generated adjusted vector of the candidate document word vector.

In some optional implementations of the present embodiment, the similarity calculating unit 503 may be further configured for: performing a linear transformation on the second query sentence semantic vector and the candidate document word vector to generate the adjusted vector of the candidate document word vector.

In some optional implementations of the present embodiment, the similarity calculating unit 503 may be further used for: performing a linear transformation on the second query sentence semantic vector and the candidate document word vector to generate a second vector, and performing an nonlinear transformation on the second vector to generate the adjusted vector of the candidate document word vector.

In some optional implementations of the present embodiment, the determining unit 502 may be further configured for: acquiring a first word vector table for characterizing a corresponding relation between a query sentence segmented word and a query word vector; and determining a query word vector sequence corresponding to the segmented word sequence of the query sentence according to the first word vector table.

In some optional implementations of the present embodiment, the determining unit 502 may be further configured for: acquiring a second word vector table for characterizing a corresponding relation between the document segmented word and the document word vector; and for each candidate document in the at least one candidate document, determining a candidate document word vector sequence corresponding to a segmented word sequence of the candidate document according to the second word vector table.

It should be noted that the implementation details and technical effects of each unit in the apparatus based on artificial intelligence provided by the embodiments of the present disclosure can refer to the descriptions of other embodiments in the present disclosure, and will not be repeated here.

Figure 6:
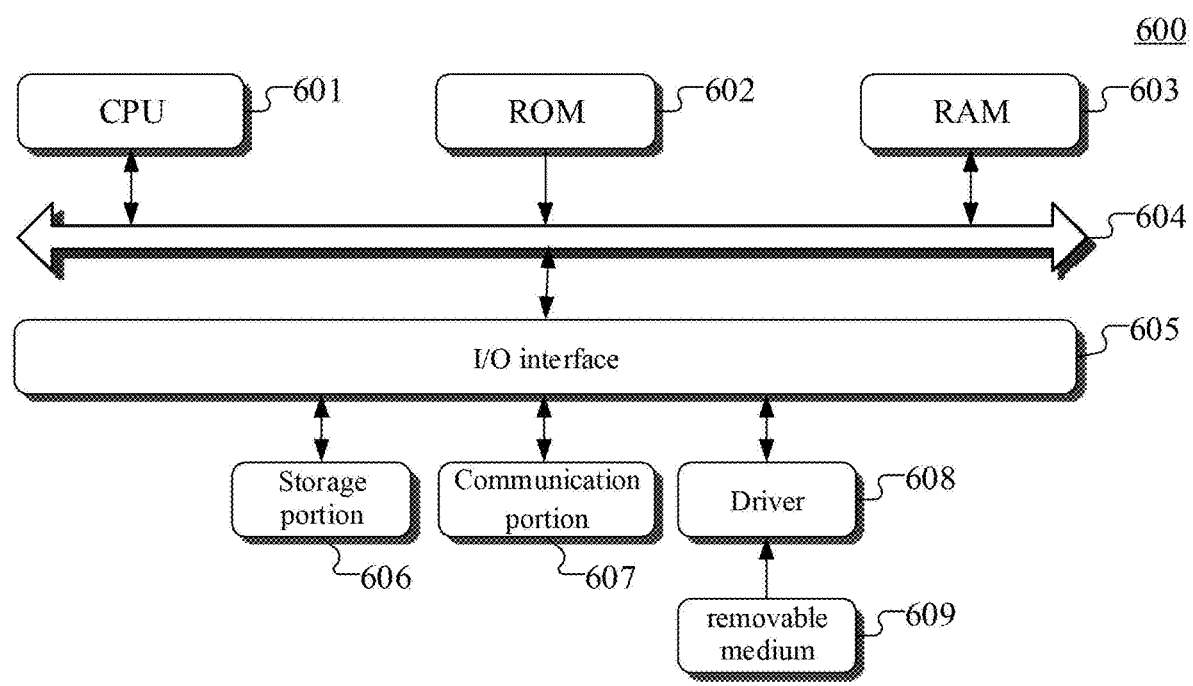
FIG. 6 is a structural schematic diagram of a computer system adapted to implement a server of the embodiments of the present disclosure.

Referring to FIG. 6, a schematic structural diagram of a computer system 600 adapted to implement a server of the embodiments of the present disclosure is shown. The server shown in FIG. 6 is only an example, and is not a limitation of the functions and scope of the embodiments of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: a storage portion 606 including a hard disk and the like; and a communication portion 607 including a network interface card, such as a LAN card and a modem. The communication portion 607 performs communication processes via a network, such as the Internet. A driver 608 is also connected to the I/O interface 605 as required. A removable medium 609, such as a magnetic disk, an optical disk, a magneto-optical disk, and a semiconductor memory, may be installed on the driver 608, to facilitate the retrieval of a computer program from the removable medium 609, and the installation thereof on the storage portion 606 as needed.

In particular, according to embodiments of the present disclosure, the process described above with reference to the flow chart may be implemented in a computer software program. For example, an embodiment of the present disclosure includes a computer program product, which includes a computer program that is embedded in a computer-readable medium. The computer program includes program codes for executing the method as illustrated in the flow chart. In such an embodiment, the computer program may be downloaded and installed from a network via the communication portion 607, and/or may be installed from the removable media 609. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a determining unit, a similarity calculating unit and a selecting unit, where the names of these units do not in some cases constitute a limitation to such units themselves. For example, the selecting unit may also be described as "a unit for selecting a candidate document."

In another aspect, the present disclosure further provides a computer-readable medium. The non-volatile computer-readable medium may be the computer-readable medium included in the apparatus in the above described embodiments, or a stand-alone computer-readable s medium not assembled into the apparatus. The computer-readable medium stores one or more programs. The one or more programs, when executed by a device, cause the device to perform operations including: acquiring at least one candidate document related to a query sentence; determining a query word vector sequence corresponding to a segmented word sequence of the query sentence, and determining a candidate document word vector sequence corresponding to a segmented word sequence of each candidate document in the at least one candidate document; performing a similarity calculation for each candidate document in the at least one candidate document, the similarity calculation comprising: importing the candidate document word vector sequence of the candidate document into a pre-trained first neural network model to generate a first candidate document semantic vector for characterizing a semantic of the candidate document, importing the query word vector sequence into the first neural network model to generate a first query sentence semantic vector for characterizing a semantic of the query sentence, and determining the similarity between the candidate document and the query sentence according to the similarity between the first candidate document semantic vector of the candidate document and the first query sentence semantic vector; and selecting, in a descending order of the similarity between the candidate document and the query sentence, a preset number of candidate document from the at least one candidate document as a search result.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A search method based on artificial intelligence, the method comprising:
   acquiring from a terminal device a plurality of candidate documents related to a query sentence in a web search;
   determining a query word vector sequence mapped to a real number vector corresponding to a segmented word sequence of the query sentence, and determining a candidate document word vector sequence mapped to a real number vector corresponding to a segmented word sequence of each candidate document in the plurality of candidate documents;
   performing a similarity calculation for each candidate document in the plurality of candidate documents, the similarity calculation comprising:
      importing the candidate document word vector sequence of the candidate document into a pre-trained first neural network model to generate a first candidate document semantic vector for characterizing a semantic of the candidate document,
      importing the candidate document word vector sequence of the candidate document into a pre-trained second neural network model to generate a second candidate document semantic vector for characterizing the semantic of the candidate document, performing a first update for each query word vector in the query word vector sequence, the first update comprising:
splicing the second candidate document semantic vector of the candidate document with the query word vector to generate an adjusted vector of the query word vector, and
updating the query word vector sequence by using the generated adjusted vector of the query word vector,
importing the updated query word vector sequence into the first neural network model to generate a first query sentence semantic vector for characterizing a semantic of the query sentence, and
determining the similarity between the candidate document and the query sentence according to the similarity between the first candidate document semantic vector of the candidate document and the first query sentence semantic vector;
selecting, in a descending order of the similarity between the candidate document and the query sentence, a preset number of candidate documents from the plurality of candidate documents as a search result; and
sending the search result comprising the preset number of candidate documents to the terminal device.

2. The method according to claim 1, wherein the splicing the second candidate document semantic vector of the candidate document with the query word vector to generate an adjusted vector of the query word vector comprises:
performing a linear transformation on the second candidate document semantic vector of the candidate document and the query word vector to generate the adjusted vector of the query word vector.

3. The method according to claim 1, wherein the splicing the second candidate document semantic vector of the candidate document with the query word vector to generate an adjusted vector of the query word vector comprises:
performing a linear transformation on the second candidate document semantic vector of the candidate document and the query word vector to generate a first vector; and
performing a nonlinear transformation on the first vector to generate the adjusted vector of the query word vector.

4. The method according to claim 1, wherein before performing the similarity calculation for each candidate document in the plurality of candidate documents, the method further comprises:
importing the query word vector sequence into a pre-trained third neural network model to generate a second query sentence semantic vector for characterizing the semantic of the query sentence; and
before importing the candidate document word vector sequence of the candidate document into the pre-trained first neural network model to generate the first candidate document semantic vector for characterizing the semantic of the candidate document, the similarity calculation further comprises:
performing a second update for each candidate document word vector in the candidate document word vector sequence of the candidate document, the second update comprising: splicing the second query sentence semantic vector with the candidate document word vector to generate an adjusted vector of the candidate document word vector, and updating the candidate document word vector by using the generated adjusted vector of the candidate document word vector.

5. The method according to claim 4, wherein the splicing the second query sentence semantic vector with the candidate document word vector to generate an adjusted vector of the candidate document word vector comprises:
performing a linear transformation on the second query sentence semantic vector and the candidate document word vector to generate the adjusted vector of the candidate document word vector.

6. The method according to claim 4, wherein the splicing the second query sentence semantic vector with the candidate document word vector to generate an adjusted vector of the candidate document word vector comprises:
performing a linear transformation on the second query sentence semantic vector and the candidate document word vector to generate the second vector; and
performing a nonlinear transformation on the second vector to generate the adjusted vector of the candidate document word vector.

7. The method according to claim 1, wherein the determining a query word vector sequence mapped to the real number vector corresponding to a segmented word sequence of the query sentence comprises:
acquiring a first word vector table for characterizing a corresponding relation between a query sentence segmented word and the query word vector; and
determining the query word vector sequence corresponding to the segmented word sequence of the query sentence according to the first word vector table.

8. The method according to claim 7, wherein the determining a candidate document word vector sequence mapped to the real number vector corresponding to a segmented word sequence of each candidate document in the plurality of candidate documents comprises:
acquiring a second word vector table for characterizing a corresponding relation between a document segmented word and a document word vector; and
for each candidate document in the plurality of candidate documents, determining the candidate document word vector sequence corresponding to the segmented word sequence of the candidate document according to the second word vector table.

9. The method according to claim 1, wherein the similarity comprises at least one of: a cosine similarity, a Pearson correlation coefficient, or a Jaccard coefficient.

10. The method according to claim 1, wherein the updating the query word vector sequence comprises applying a nonlinear transformation by applying a Sigmoid function or a hyperbolic tangent function.

11. A search apparatus based on artificial intelligence, the apparatus comprising:
at least one processor; and
a memory storing instructions, the instructions when executed by the at least one processor, cause the at least one processor to perform operations, the operations comprising:
acquiring from a terminal device a plurality of candidate documents related to a query sentence in a web search;
determining a query word vector sequence mapped to a real number vector corresponding to a segmented word sequence of the query sentence, and determining a candidate document word vector sequence mapped to a real number vector corresponding to a segmented word sequence of each candidate document in the plurality of candidate documents;
performing a similarity calculation for each candidate document in the plurality of candidate documents, the similarity calculation comprising:

importing the candidate document word vector sequence of the candidate document into a pre-trained first neural network model to generate a first candidate document semantic vector for characterizing a semantic of the candidate document, importing the candidate document word vector sequence of the candidate document into a pre-trained second neural network model to generate a second candidate document semantic vector for characterizing the semantic of the candidate document, performing a first update for each query word vector in the query word vector sequence, the first update comprising:
- splicing the second candidate document semantic vector of the candidate document with the query word vector to generate an adjusted vector of the query word vector, and
- updating the query word vector sequence by using the generated adjusted vector of the query word vector, importing the updated query word vector sequence into the first neural network model to generate a first query sentence semantic vector for characterizing a semantic of the query sentence, and determining the similarity between the candidate document and the query sentence according to the similarity between the first candidate document semantic vector of the candidate document and the first query sentence semantic vector;

selecting, in a descending order of the similarity between the candidate document and the query sentence, a preset number of candidate documents from the plurality of candidate documents as a search result; and sending the search result comprising the preset number of candidate documents to the terminal device.

12. The apparatus according to claim 11, wherein the splicing the second candidate document semantic vector of the candidate document with the query word vector to generate an adjusted vector of the query word vector comprises:
performing a linear transformation on the second candidate document semantic vector of the candidate document and the query word vector to generate the adjusted vector of the query word vector.

13. The apparatus according to claim 11, wherein the splicing the second candidate document semantic vector of the candidate document with the query word vector to generate an adjusted vector of the query word vector comprises:
performing a linear transformation on the second candidate document semantic vector of the candidate document and the query word vector to generate a first vector; and
performing a nonlinear transformation on the first vector to generate the adjusted vector of the query word vector.

14. The apparatus according to claim 11, wherein before performing the similarity calculation for each candidate document in the plurality of candidate documents, the operations comprise:
importing the query word vector sequence into a pre-trained third neural network model to generate a second query sentence semantic vector for characterizing the semantic of the query sentence; and
before importing the candidate document word vector sequence of the candidate document into the pre-trained first neural network model to generate the first candidate document semantic vector for characterizing the semantic of the candidate document, the similarity calculation further comprises:
performing a second update for each candidate document word vector in the candidate document word vector sequence of the candidate document, the second update comprising: splicing the second query sentence semantic vector with the candidate document word vector to generate an adjusted vector of the candidate document word vector, and updating the candidate document word vector by using the generated adjusted vector of the candidate document word vector.

15. The apparatus according to claim 14, wherein the splicing the second query sentence semantic vector with the candidate document word vector to generate an adjusted vector of the candidate document word vector comprises:
performing a linear transformation on the second query sentence semantic vector and the candidate document word vector to generate the adjusted vector of the candidate document word vector.

16. The apparatus according to claim 14, wherein the splicing the second query sentence semantic vector with the candidate document word vector to generate an adjusted vector of the candidate document word vector comprises:
performing a linear transformation on the second query sentence semantic vector and the candidate document word vector to generate the second vector; and
performing a nonlinear transformation on the second vector to generate the adjusted vector of the candidate document word vector.

17. The apparatus according to claim 11, wherein the determining a query word vector sequence mapped to the real number vector corresponding to a segmented word sequence of the query sentence comprises:
acquiring a first word vector table for characterizing a corresponding relation between a query sentence segmented word and the query word vector; and
determining the query word vector sequence corresponding to the segmented word sequence of the query sentence according to the first word vector table.

18. The apparatus according to claim 17, wherein the determining a candidate document word vector sequence mapped to the real number vector corresponding to a segmented word sequence of each candidate document in the plurality of candidate documents comprises:
acquiring a second word vector table for characterizing a corresponding relation between a document segmented word and a document word vector; and
for each candidate document in the plurality of candidate documents, determining the candidate document word vector sequence corresponding to the segmented word sequence of the candidate document according to the second word vector table.

19. A non-transitory computer medium, storing a computer program, wherein the program when executed by a processor, causes the processor to perform operations, the operations comprising:
acquiring from a terminal device a plurality of candidate documents related to a query sentence in a web search;
determining a query word vector sequence mapped to a real number vector corresponding to a segmented word sequence of the query sentence, and determining a candidate document word vector sequence mapped to a real number vector corresponding to a segmented word sequence of each candidate document in the plurality of candidate documents;

performing a similarity calculation for each candidate document in the plurality of candidate documents, the similarity calculation comprising:
importing the candidate document word vector sequence of the candidate document into a pre-trained first neural network model to generate a first candidate document semantic vector for characterizing a semantic of the candidate document,
importing the candidate document word vector sequence of the candidate document into a pre-trained second neural network model to generate a second candidate document semantic vector for characterizing the semantic of the candidate document,
performing a first update for each query word vector in the query word vector sequence, the first update comprising:
splicing the second candidate document semantic vector of the candidate document with the query word vector to gene rate an adjusted vector of the query word vector, and
updating the query word vector sequence by using the generated adjusted vector of the query word vector,
importing the updated query word vector sequence into the first neural network model to generate a first query sentence semantic vector for characterizing a semantic of the query sentence, and
determining the similarity between the candidate document and the query sentence according to the similarity between the first candidate document semantic vector of the candidate document and the first query sentence semantic vector;
selecting, in a descending order of the similarity between the candidate document and the query sentence, a preset number of candidate documents from the plurality of candidate documents as a search result; and
sending the search result comprising the preset number of candidate documents to the terminal device.

* * * * *